United States Patent [19]
Ito et al.

[11] Patent Number: 5,799,199
[45] Date of Patent: Aug. 25, 1998

[54] MEMORY DEVICE IN WHICH ELECTRICAL POWER CONSUMPTION OF POWER CIRCUIT THEREOF IS REDUCED DURING AN IDLE STATE

[75] Inventors: Masahiro Ito, Higashine; Nobuhiko Isato, Kawasaki, both of Japan

[73] Assignee: Fujitsu Limited, Kawasaki, Japan

[21] Appl. No.: 688,905

[22] Filed: Jul. 31, 1996

[30] Foreign Application Priority Data

Aug. 7, 1995 [JP] Japan .................................. 7-201176

[51] Int. Cl.⁶ .......................... G06F 1/00; G06F 1/18; G06F 1/26
[52] U.S. Cl. .......................... 395/750.06; 395/750.03; 364/707
[58] Field of Search .......................... 395/750, 750.01, 395/750.03, 750.04, 750.05, 750.06, 750.08, 735, 740; 364/707

[56] References Cited

U.S. PATENT DOCUMENTS

| | | | |
|---|---|---|---|
| 5,481,730 | 1/1996 | Brown et al. | 395/750 |
| 5,535,400 | 7/1996 | Belmont | 395/750 |
| 5,539,681 | 7/1996 | Alexander et al. | 364/707 |
| 5,546,590 | 8/1996 | Pierce | 395/750 |
| 5,574,920 | 11/1996 | Parry | 395/750 |
| 5,603,040 | 2/1997 | Frager et al. | 395/750 |
| 5,617,572 | 4/1997 | Pearce et al. | 395/750 |
| 5,638,307 | 6/1997 | Kamimura et al. | 364/707 |
| 5,692,202 | 11/1997 | Kardach et al. | 395/750 |
| 5,713,027 | 1/1998 | Soejima et al. | 395/750 |

FOREIGN PATENT DOCUMENTS

| | | |
|---|---|---|
| 4290109 | 10/1992 | Japan . |
| 4328616 | 11/1992 | Japan . |
| 7230346 | 8/1995 | Japan . |

*Primary Examiner*—Ayaz R. Sheikh
*Assistant Examiner*—Raymond N Phan
*Attorney, Agent, or Firm*—Greer, Burns & Crain, Ltd.

[57] ABSTRACT

A memory device connected to a host computer is disclosed wherein when a power consumption reducing function is performed, the power consumption can be further reduced. The memory device includes a memory medium, a data read/write circuit, a power circuit, an electric power processing IC, an interface circuit, and an MPU. The interface circuit is connected to the portion of the power circuit on the upstream side of the electric power processing IC. The circuits including the MPU are connected to the portion of the power circuit on the downstream side of the electric power processing IC. The interface circuit is provided with a sleep signal generating circuit which generates a sleep signal which is sent to the power processing IC to stop the power supply to the downstream side of the power processing IC when a specific instruction signal is supplied from the host computer. Thus, the power consumption of the memory device can be remarkably reduced. The supply of the sleep signal is stopped immediately after an optical disc or the like is inserted in the drive.

7 Claims, 8 Drawing Sheets

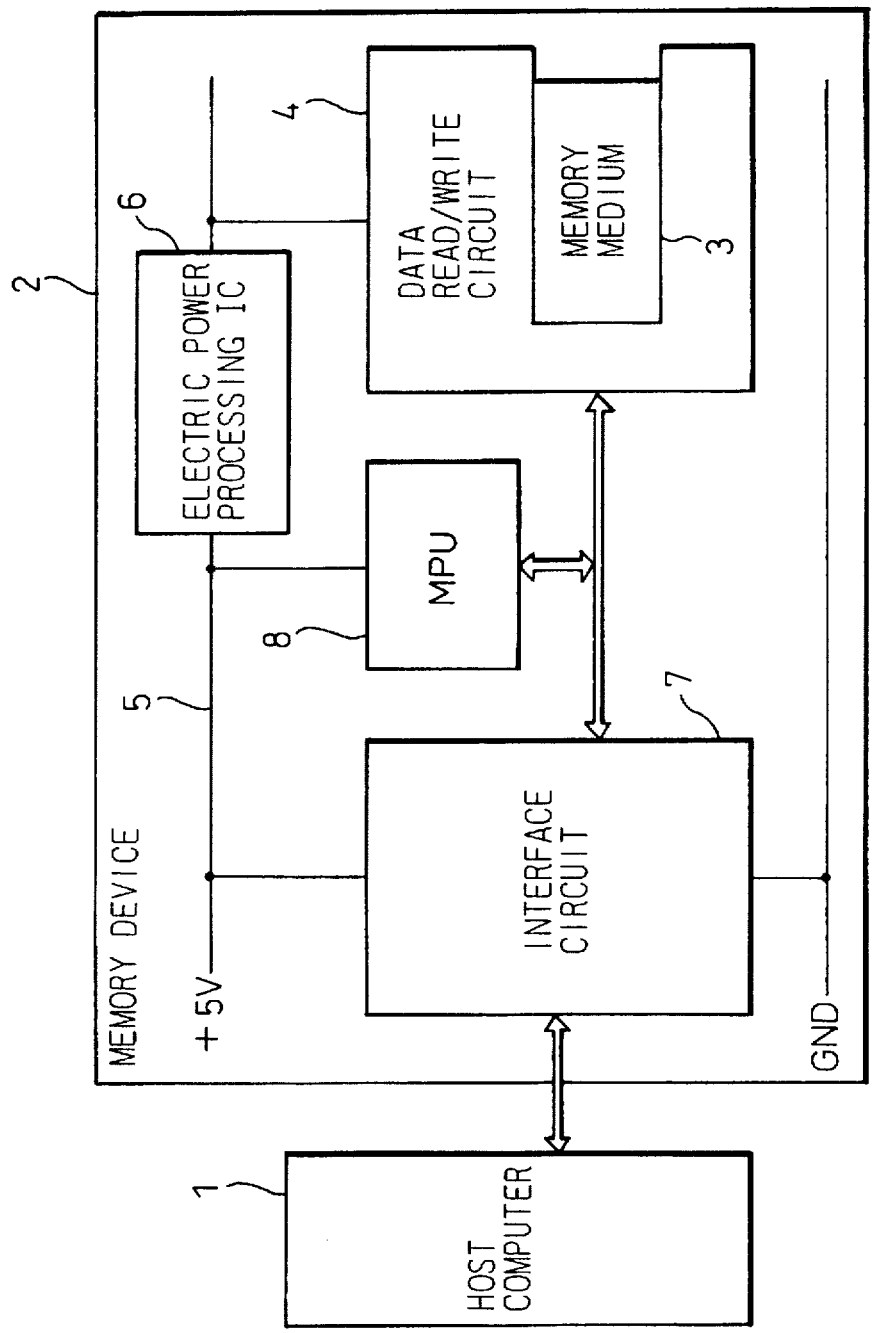

MEMORY DEVICE IN WHICH ELECTRICAL POWER CONSUMPTION OF POWER CIRCUIT THEREOF IS REDUCED DURING AN IDLE STATE

BACKGROUND OF THE INVENTION

1. Field of the Invention

The present invention relates to a memory device in which the electrical power consumption of a power circuit is reduced during an idle state of the memory device, and more precisely, it relates to an external memory device for a computer, containing a magnetic disk apparatus or an optical disk apparatus, etc., wherein, when the memory device does not operate, the power consumption of the power circuit is reduced.

2. Description of the Related Art

In conventional external data storage apparatuses for a computer, such as a magnetic disk apparatus or an optical disk apparatus, connected to a host computer, attempts have been made to reduce the power consumption when the apparatus is not used.

For instance, in a known external data storage apparatus, the power supply to part of a drive and control circuit is stopped in response to an externally input signal, when the operation of the apparatus ends, to reduce the power consumption. Namely, in conventional magnetic disk apparatuses or optical disk apparatuses, when the operation of the apparatus is stopped, the power supply to circuit portions of the drive and control circuit other than part of integrated circuits of the drive and control circuit within the apparatus or part of an incorporated micro processor unit (MPU), to which the power must be continuously supplied is stopped to decrease the power consumption.

However, in the conventional external data storage apparatuses, when the power consumption reducing function is effectuated, a signal communication is sometimes necessary between the MPU which is supplied with the power through the power circuit and a circuit which does not need to operate when the apparatus does not operate. In such a case, the power consumption is not sufficiently reduced even when the power consumption reducing function is effectuated.

SUMMARY OF THE INVENTION

It is an object of the present invention to provide a memory device connected to a host computer, in which a greater reduction in power consumption can be expected when the power consumption reducing function of the memory device is effectuated.

According to a first aspect of the present invention, there is provided a memory device connected to a host computer and comprising a memory medium, a data read/write circuit including a data read/write mechanism to read and write data from and onto the recording medium, a power circuit, an electric power processing IC provided in the power circuit, an interface circuit provided at the connection to the host computer, and a micro-processor unit which controls the operation of the memory device, the interface circuit is connected to the portion of the power circuit on the upstream side of the electric power processing IC and has an output terminal connected to the electric power processing IC, and the micro-processor unit is connected to the portion of the power circuit on the downstream side of the electric power processing IC. The interface circuit is provided with a sleep signal generating circuit which generates a sleep signal to stop the power supply to the downstream side of the electric power processing IC when a specific instruction signal is supplied from the host computer; whereby the power supply to the portion of the power circuit on the downstream side of the electric power processing IC including the microprocessor unit is interrupted in accordance with the specific instruction signal to reduce the power consumption.

According to a second aspect of the present invention, the sleep signal generating circuit stops the issuance of the sleep signal when the memory medium is inserted in the data read/write circuit to thereby re-open the power supply to the portion of the power circuit on the downstream side of the electric power processing IC.

According to a third aspect of the present invention, provision is made of a pull-down resistor connected to an input/output terminal of the interface circuit to protect an internal circuit of the interface circuit when the power supply to the portion of the power circuit on the downstream side of the electric power processing IC is stopped in response to the sleep signal.

According to a fourth aspect of the present invention, provision is made of a logic circuit connected to an input/output terminal of the interface circuit to prevent a wrong signal from being input by mistake to an internal circuit of the interface circuit when the power voltage applied to the portions of the power circuit on the upstream and downstream sides of the electric power processing IC varies.

In a memory device as constructed above, wherein the power consumption of the power circuit in an idle state is reduced, according to the present invention, since the portion of the power circuit on the power supply side with respect to the electric power processing IC is connected only to the minimum number of necessary circuit elements, the power consumption when the power consumption reducing function is effectuated can be remarkably reduced.

BRIEF DESCRIPTION OF THE DRAWINGS

The present invention will be more clearly understood from the description as set forth below with reference to the accompanying drawings, wherein:

FIG. 1A is a block diagram of a basic structure of a known memory device and a circuitry connecting the same to a host computer;

FIG. 4 is a timing chart of a memory device when the power source is turned ON;

DESCRIPTION OF THE PREFERRED EMBODIMENTS

Figure 1B:
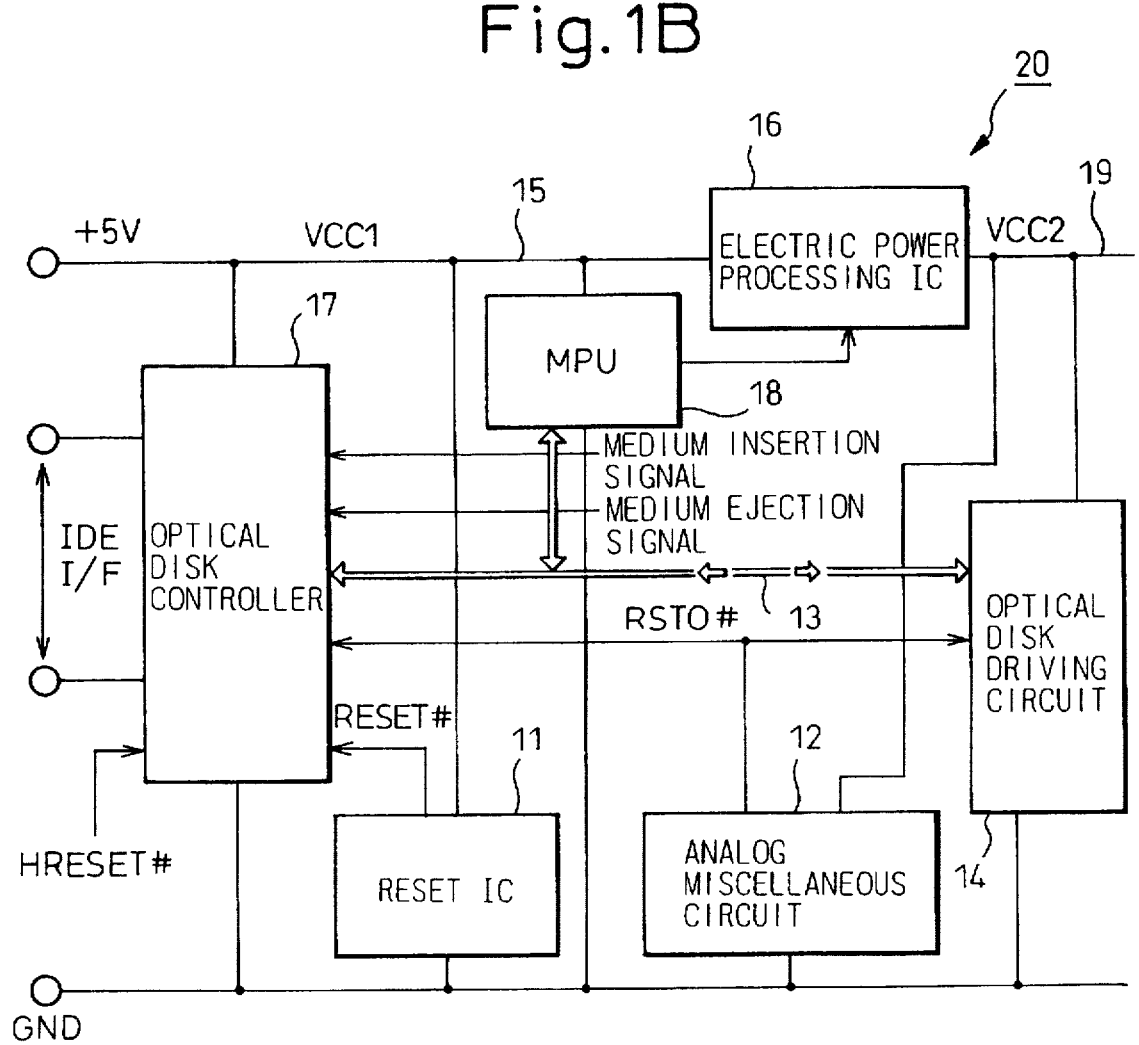
FIG. 1B is a block diagram of an internal structure of a memory device shown in FIG. 1A.

Before describing the preferred embodiments, an explanation will be given of the conventional memory device shown in FIGS. 1A to 1C.

FIG. 1A shows a block diagram of a basic structure of a known memory device 2 and a circuitry connecting the same to a host computer 1. The memory device 2 is comprised of a memory medium 3, a data read/write circuit 4, a power source circuit 5, an electric power processing IC 6, an interface circuit 7, and a micro processor unit (MPU) 8. As the memory medium 3, for example, an optical disk or a magnetic disk, etc. can be used. The data read/write circuit 4 contains a data read/write mechanism which reads and writes data from and onto the memory medium 3. The power source circuit 5 is connected to a power supply circuit (not shown) to supply each circuit of the memory device 2 with a constant voltage, say, +5 V. The MPU 8 controls the operation of the memory device 2 and is connected to the data read/write circuit 4 and the interface circuit 7 which is connected to the host computer 1. The electric power processing circuit 6 is provided in the power circuit 5. The interface circuit 7 and the MPU 8 are connected to the portion of the power circuit 5 on the input side of the power processing circuit 6. The data read/write circuit 4 is connected to the portion of the power circuit 5 on the output side of the power processing circuit 6.

FIG. 1B shows an internal structure of a known memory device 20 using an optical disk by way of example. In FIG. 1B, the circuit 20 is connected to a host computer (not shown) on the left end side. Namely, an optical disk controller 17 is connected to the host computer through an IDE (Integrated Device Electronics) interface (I/F). The optical disk controller 17 is connected to a line between the power circuit (Vcc1) 15 connected to a power supply circuit (not shown) and the ground GND. A medium insertion signal which represents an insertion of the optical disk or a medium discharge signal sent from an ejection switch (not shown) is input to the optical disk controller 17.

A reset IC 11 and the MPU 18 are also connected to lines between the power circuit (Vcc1) 15 and the ground GND. Moreover, the electric power processing IC 16 is connected in series with the power circuit (Vcc1) 15. The output terminal (downstream side) of the power processing IC 16 is connected to a second power circuit (Vcc2) 19. The power supply to the latter is controlled by the power processing IC. An analog miscellaneous circuit 12 and an optical disk driving circuit 14 are connected to lines between the second power circuit (Vcc2) 19 and the ground GND.

The MPU 18 is connected to the optical disk driving circuit 14 and the optical disk controller 17 through a bus 13. The reset signal RESET# from the reset IC 11 is supplied to the optical disk controller 17 and the output signal of the analog miscellaneous circuit 12 is supplied to the optical disk driving circuit 14 and the optical disk controller 17. The control signal from the MPU 18 is supplied to the power processing IC 16. The reset signal HRESET# from the host computer is supplied to the optical disk controller 17.

Figure 1C:
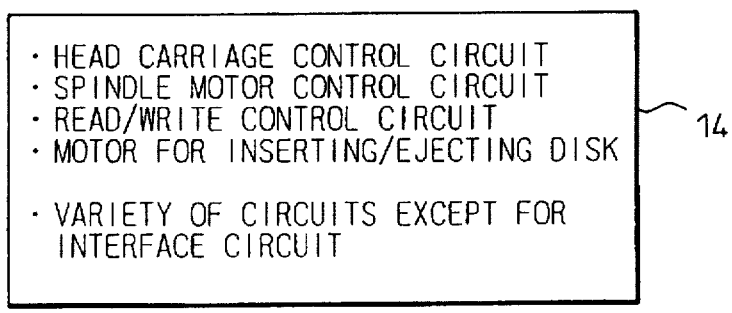
FIG. 1C is an explanatory view of a circuit contained in an optical disk driving circuit in a memory device shown in FIG. 1B.

FIG. 1C shows an explanatory view of contents of the circuits contained in the optical disk driving circuit 14 shown in FIG. 1B. There are a head carriage control circuit, a spindle motor control circuit, a read/write control circuit, a motor for inserting/ejecting the optical disk, and a variety of circuits other than the interface circuit, in the optical disk driving circuit 14. No detailed explanation of each circuit will be given hereinafter.

The known memory device 20 as constructed above has a power consumption reducing function. The power consumption reducing function is performed in accordance with a command signal which is supplied from the host computer to the MPU 18 through the optical disk controller 17 to reduce the power to be consumed. The MPU 18 supplies a signal to the power processing IC 16 in response to the power consumption reducing command signal to stop the power supply to the portion of the power circuit 19 on the output side of the power processing IC 16.

However, in the conventional memory device 20, even when the power consumption reducing function is performed, power is supplied to the MPU 18 through the power circuit (Vcc1) 15. While the power is supplied to the MPU 18 through the power circuit (Vcc1) 15, there is a communication of extraneous signals between the MPU 18 and the optical disk driving circuit 14, thus resulting in an insufficient reduction in the amount of power consumption. The present invention is aimed at an elimination of the extraneous signals between the MPU 18 and the optical disc driving circuit 14 to thereby further reduce the power consumption when the power consumption reducing function is performed.

Figure 2A:
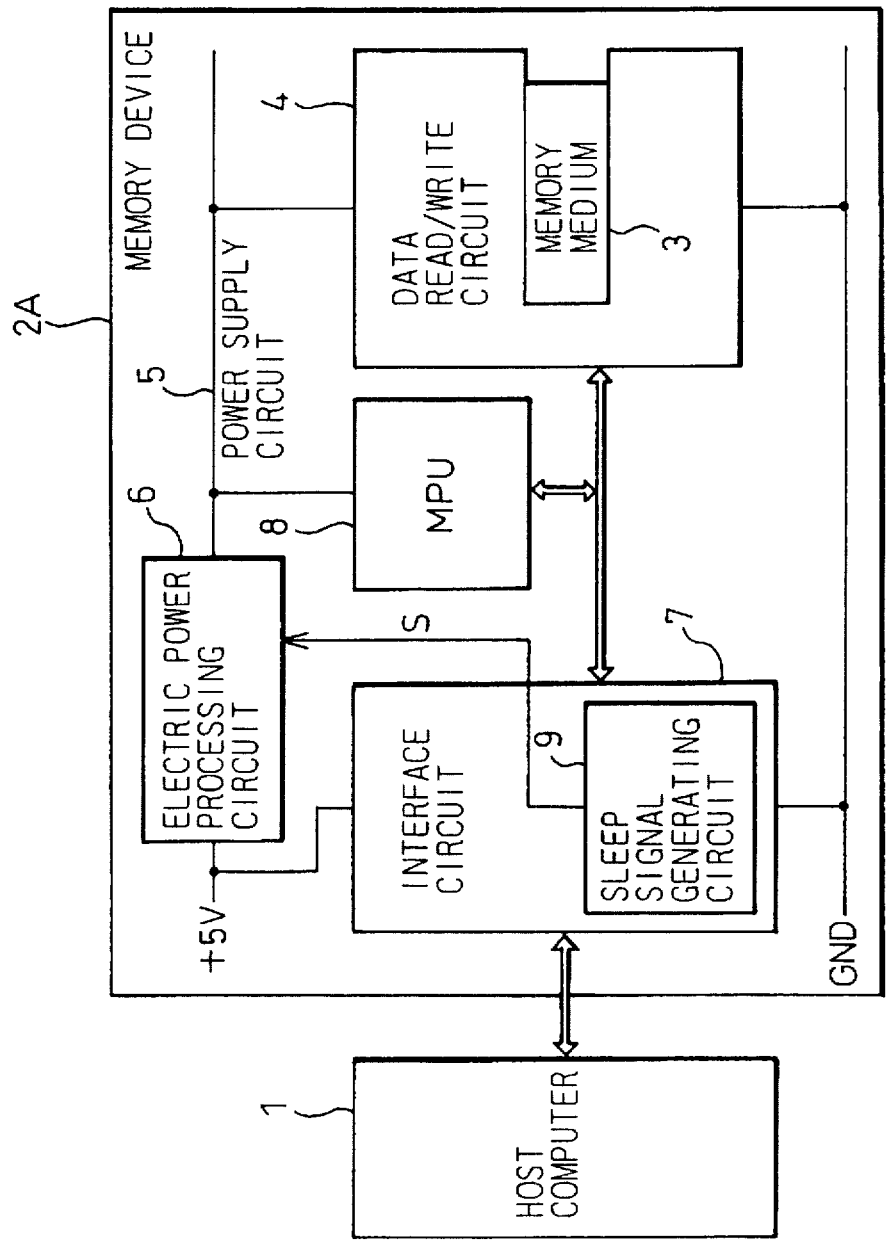
FIG. 2A is a block diagram of a basic structure of a memory device and a circuitry connecting the same to a host computer, according to the present invention.

FIG. 2A shows a block diagram of an internal structure of a memory device 20 according to the present invention and an electric connection of the memory device to the host computer. In FIG. 2A, the elements corresponding to those of the known memory device 2 shown in FIG. 1A are designated with like reference numerals.

As can be seen in FIG. 2A, the memory device 2A of the present invention connected to the host computer 1 is comprised of a memory medium 3, a data read/write circuit 4 having a data read/write mechanism which reads/writes data from and onto the recording medium 3, a power circuit 5, an electric power processing IC provided in the power circuit 5, an interface circuit 7 provided at the connection terminal of the memory device to the host computer 1, and an MPU 8 which controls the operations of the memory device 2A.

In the memory device 2A of the present invention, the interface circuit 7 is connected to the portion of the power circuit 5 on the upstream side (input side) of the power processing IC 6 and the output terminal of the interface circuit 7 is connected to the power processing IC 6. The MPU 8 is connected to the portion of the power circuit 5 on the downstream side (output side) of the power processing IC 6 and the interface circuit 7 is provided with a sleep signal generating circuit 9 which generates a sleep signal S. The sleep signal generating circuit 9 generates the sleep signal S when a specific instruction signal is input thereto from the host computer 1. The sleep signal S is input to the power processing IC 6 which then stops the power supply to the downstream side. Thus, in the present invention, the power supply to the portion of the power circuit 5 on the downstream side of the power processing IC 6 including the MPU 8 is interrupted in accordance with the specific instruction signal from the host computer 1.

Figure 2B:
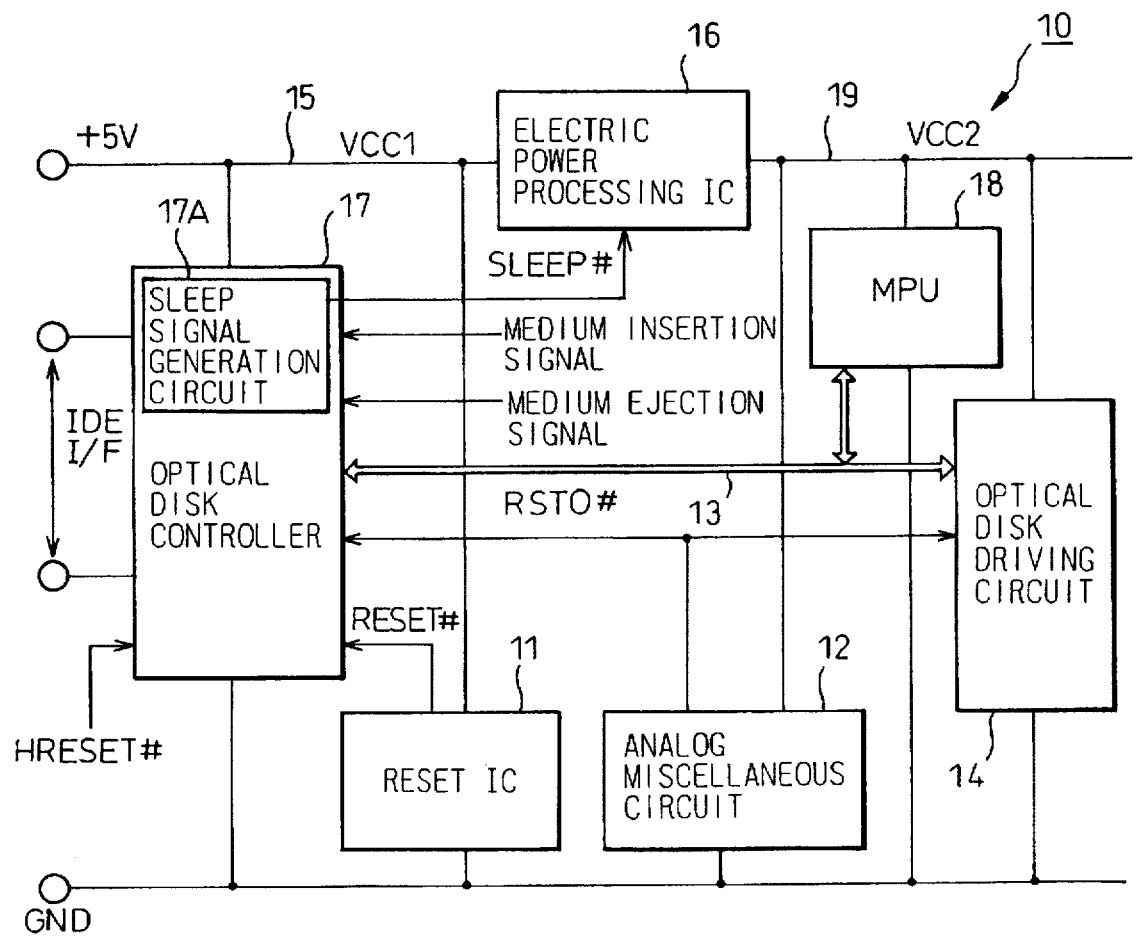
FIG. 2B is a block diagram of an internal structure of a memory device shown in FIG. 2A.

FIG. 2B, shows the internal structure of a memory device 10 identical to that shown in FIG. 2A and using an optical disk, by way of example. In FIG. 2B, the elements corresponding to those in FIG. 1B are designated with like numerals.

In FIG. 2B, the circuit 10 is connected to a host computer (not shown) on the left side of the circuit. Namely, the optical disk controller 17 is connected to the host computer through the IDE interface (I/F). The optical disk controller 17 is connected to a line between the power circuit (Vcc1) 15 connected to a power supply circuit (not shown) and the ground GND. A medium insertion signal which represents an insertion of the optical disk or a medium discharge signal sent from an ejection switch (not shown) is input to the optical disk controller 17.

A reset IC 11 is connected to a line between the power circuit (Vcc1) 15 and the ground GND. The reset signal RESET# from the reset IC 11 is input to the optical disk controller 17.

Moreover, the electric power processing IC 16 is connected in series to the power circuit (Vcc1) 15. The output terminal (downstream side) of the power processing IC 16 is connected to a second power circuit (Vcc2) 19. The power supply to the latter is controlled by the power processing IC. An analog miscellaneous circuit 12, the MPU 18 and an optical disk driving circuit 14 are connected to lines between the second power circuit (Vcc2) 19 and the ground GND.

Figure 2C:
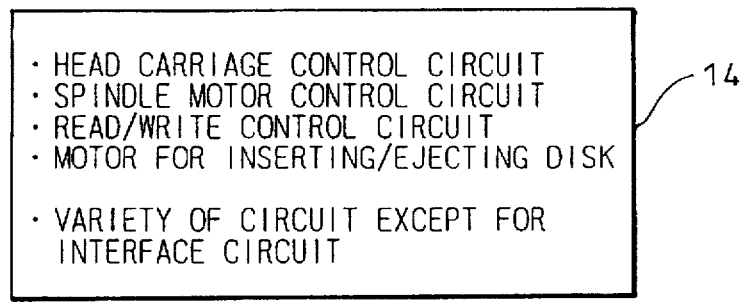
FIG. 2C is an explanatory view of a circuit contained in an optical disk driving circuit in a memory device shown in FIG. 2B.

FIG. 2C shows an internal structure of the optical disk driving circuit 14 shown in FIG. 2B. There are a head carriage control circuit, a spindle motor control circuit, a read/write control circuit, a motor for inserting/ejecting the optical disk, and a variety of circuits other than the interface circuit, in the optical disk driving circuit 14. No detailed explanation of each circuit will be given hereinafter.

The MPU 18 is connected to the optical disk driving circuit 14 and the optical disk controller 17 through the bus 13. The output signal of the analog miscellaneous circuit 12 is supplied to the optical disk driving circuit 14 and the optical disk controller 17.

The optical disk controller 17 is provided therein with a sleep signal generating circuit 17A which generates a sleep signal SLEEP#. When the power consumption reducing command signal is supplied from the host computer to the optical disk controller 17, the latter generates and sends the sleep signal SLEEP# to the power processing IC 16. Moreover, the reset signal HRESET# from the host computer is supplied to the optical disk controller 17.

When the sleep signal SLEEP# is sent to the power processing IC 16 from the optical disk controller 17, the power processing IC 16 stops the power supply to the second power circuit (Vcc2) 19 connected to the output side of the power processing IC. As a result, no power is supplied to the analog miscellaneous circuit 12, the optical disk driving circuit 14, or the MPU 18, and hence, the power of +5 V is supplied only to the reset IC 11, the optical disk controller 17, and the electric power processing IC 16. Thus, the power consumption can be reduced owing to an absence of the power supply to the MPU 18, in comparison with the known memory device 20.

In the known memory device 20 which has been discussed above with reference to FIG. 1B, the power of 0.2 to 0.3 W is consumed even when the power consumption reducing function is performed. Whereas, in the memory device 10 of the present invention shown in FIG. 2B, the power less than 0.1 W is consumed when the power consumption reducing function is effectuated.

Figure 3:
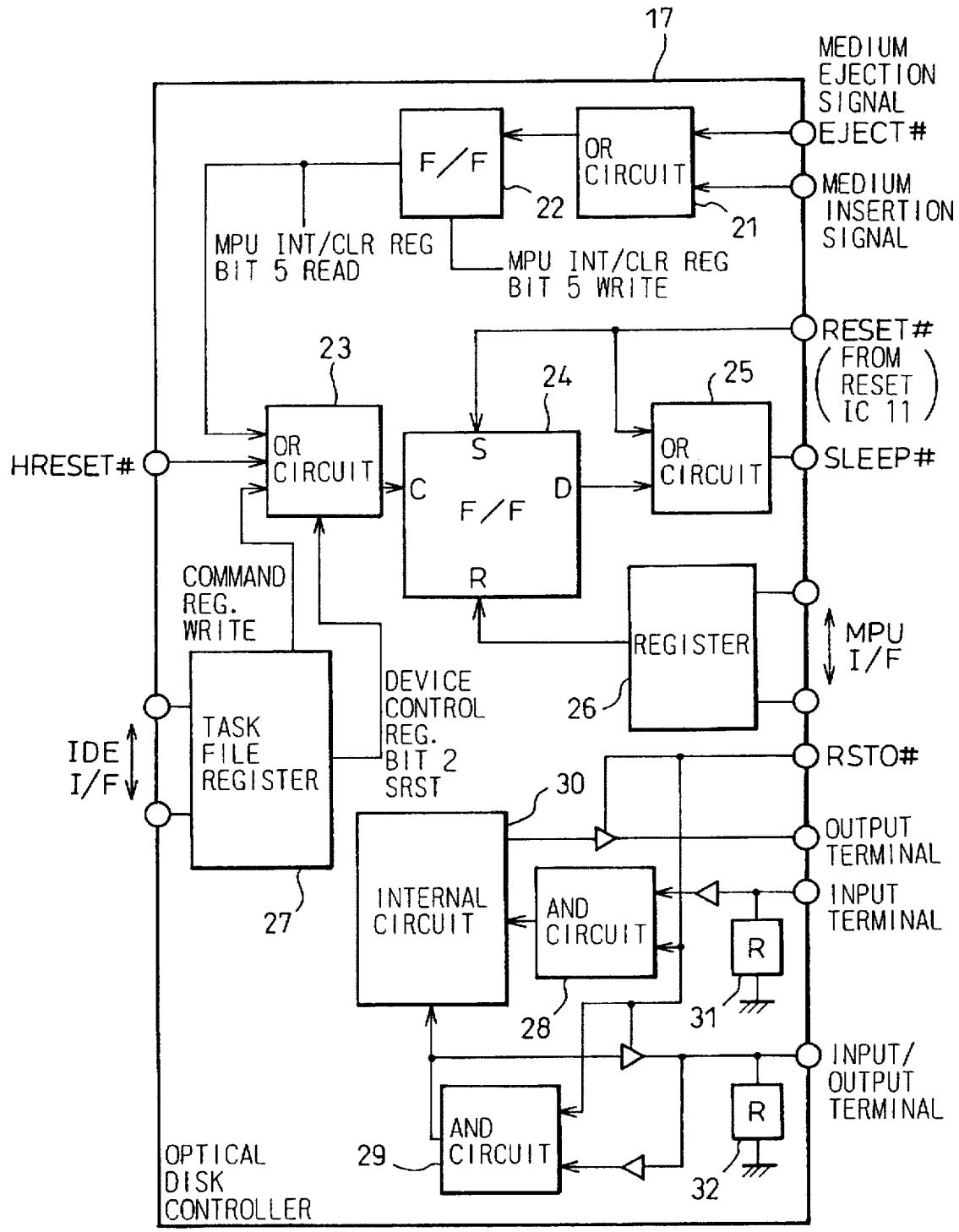
FIG. 3 is a block diagram of an internal structure of an optical disk controller shown in FIG. 2A.

FIG. 3B shows a circuit diagram of an internal structure of the optical disk controller 17. In FIG. 3, numerals 21, 23 and 25 designate the OR circuit; 22, 24 the flip-flop (F/F); 26 the register; 27 the task file register; 28, 29 the AND circuit; 30 the internal circuit; and 31, 32 the pull-down resistor, respectively. The elements indicated by a triangle are buffers.

The medium discharge signal EJECT# is supplied from the optical disk ejection switch (not shown) to the OR circuit 21. The output of the OR circuit 21 is input to the F/F 22. Consequently, when the medium discharge signal EJECT# or the medium insertion signal is input to the optical disk controller 17, the signal is supplied from the F/F 22 to the OR circuit 23. The host reset signal HRESET# from the host computer not shown, and the signal from the task file register 27 are input to the OR circuit 23. The output of the OR circuit 23 is input to the input terminal C of the F/F 24.

The reset signal RESET# is supplied from the reset IC to the input terminal S of the F/F 24 and the output signal of the register 26, which is connected to the MPU 18 through the interface, is supplied to the input terminal R of the F/F 24. The output signal of the F/F 24 is sent to the OR circuit 25 from the output terminal D. The reset signal RESET# is also supplied to the OR circuit 25 from the reset IC 11.

The internal circuit 30 outputs the reset signal RESET# and is connected to the output terminal of the optical disk controller 17. The signals from the AND circuits 28 and 29 are input to the internal circuit 30. The signal from the input terminal of the optical disk controller 17 and the reset signal RSTO# are supplied to the AND circuit 28. The signal from the output terminal of the optical disk controller 17 and the reset signal RSTO# are input to the AND circuit 29.

The pull-down resistors 31 and 32 connected to the input terminal and input/output terminal of the optical disk controller 17 are provided to prevent the passing current from flowing into the input element when the power is cut so that the potential becomes unstable and is at an intermediate level. The level of the reset signal RSTO# supplied to one of the terminals of each AND circuit 28 or 29 becomes low at the commencement or suspension of the power supply. When the reset signal RSTO# is at low level, there is no output to be supplied to the AND circuits 28 and 29. Thus, no external signal can be written in the internal circuit 30 by mistake, upon transfer from ON to OFF of the power or vice versa.

The sleep signal SLEEP# is output from the optical disk controller 17 as constructed above only when the reset signal RESET# from the reset IC 11 is input or the signal from the F/F 24 is input. The signal is output from the output terminal D of the F/F 24 when the reset signal RESET# from the reset IC 11 is input to the input terminal S, when the output from the OR circuit 23 is input to the input terminal C or when the signal from the MPU 18 through the register 26 is input to the input terminal R, etc. When the output of the OR circuit 23 is input to the input terminal C of the F/F 24, the sleep signal SLEEP# is cleared.

Figure 4:
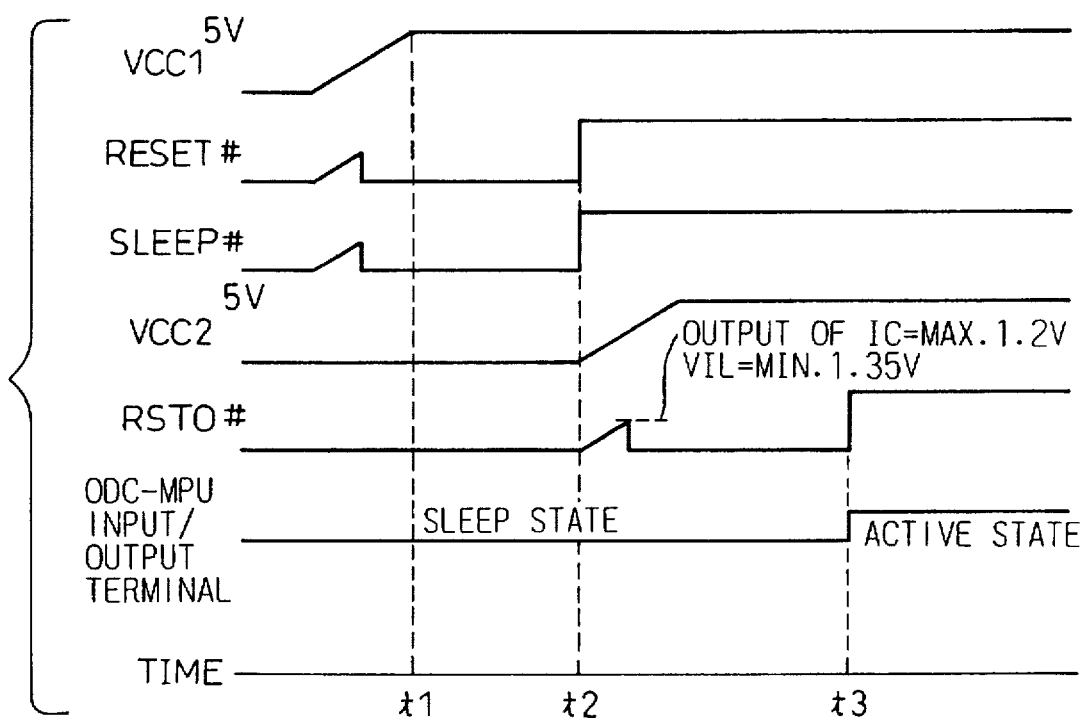

FIG. 4 shows a timing chart in the memory device 10 discussed with reference to FIGS. 2B and 3, when the power source is turned ON. In FIG. 4, "Vcc1" represents the wave-shape of the power circuit 15, "RESET#" represents the wave-shape of the reset signal from the reset IC 11, "SLEEP#" represents the wave-shape of the sleep signal from the optical disk controller 17, "Vcc2" represents the wave-shape of the portion of the power circuit 19 on the downstream side of the power processing IC 16, "RSTO#" represents the reset signal from the reset IC 11, and the lowermost wave-shape represents the state of the input/output terminal portion of the optical disk controller (ODC) 17 with respect to the MPU 18, respectively.

When the level of the sleep signal SLEEP# becomes high at time t2 in response to the reset signal RESET# after the level of the power circuit (Vcc1) 15 rises at time t1, the level of the second power circuit rises. Thereafter, when the reset signal RSTO# from the analog miscellaneous circuit 12 rises at time t3, the input/output terminal portion of the optical disk controller 17 for the MPU 18 is turned from the sleep state into an active state.

Figure 5:
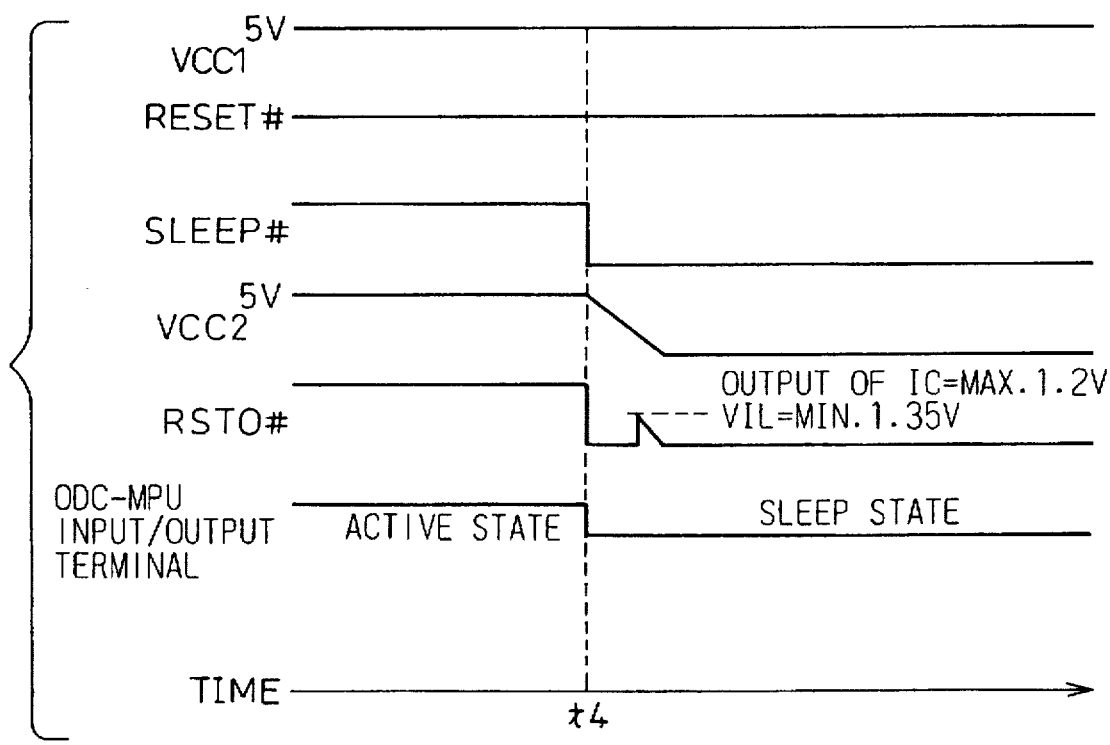
FIG. 5 is a timing chart of a memory device at the transfer to a sleep state; and, FIG. 6 is a timing chart of a memory device when the power supply leaves a sleep state.

FIG. 5 shows a timing chart in the memory device 10 which has been explained with reference to FIGS. 2B and 3, upon transfer to the sleep state. If the level of the sleep signal SLEEP# becomes low at time t4 when the power is supplied to the power circuit (Vcc1) 15, the power supply to the second power circuit (Vcc2) 19 is stopped by the operation of the power processing IC 16, so that the second power circuit (Vcc2) 19 is turned OFF. As a result, the power supply to the analog miscellaneous circuit 12 connected thereto ends and accordingly, the level of the reset signal RSTO# from the analog miscellaneous circuit 12 becomes low. Consequently, the AND circuits 28 and 29 to which the reset signal RSTO# is supplied are interrupted, and thus, the input/output terminal portion of the optical disk controller (ODC) 17 for the MPU 18 is turned from the active state into the sleep state.

Figure 6:
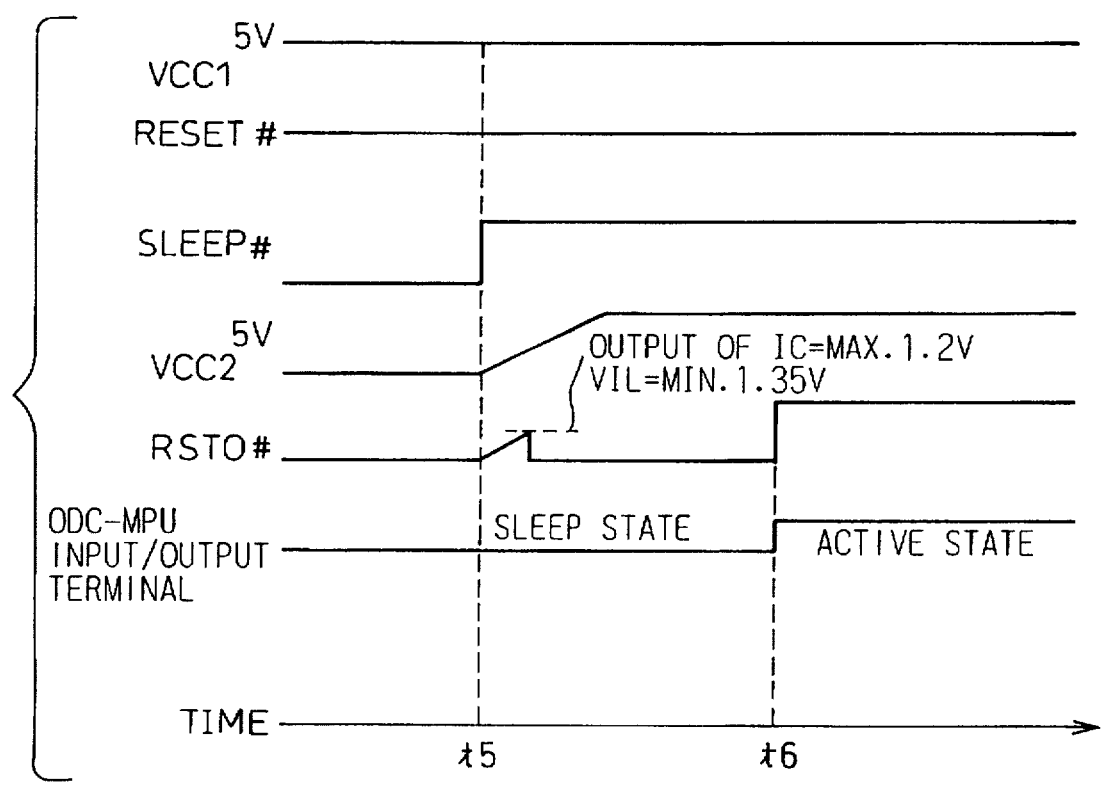

FIG. 6 shows a timing chart in the memory device 10, which has been explained with reference to FIGS. 2B and 3, when the power supply is commenced in the sleep state. If the level of the sleep signal SLEEP# becomes high at time t5 when the power is supplied to the power circuit (Vcc1) 15 and when the level of the reset signal RESET# from the reset IC 11 is high, the power supply to the second power circuit (Vcc2) 19 is re-commenced by the operation of the power processing IC 16, so that the second power circuit (Vcc2) 19 is turned ON. As a result, the power supply to the analog miscellaneous circuit 12 connected thereto begins. The analog miscellaneous circuit 12 does not issue the reset signal RSTO# immediately after the re-commencement of the power supply. Namely, the analog miscellaneous circuit 12 issues the reset signal RSTO# whose level is high at time t6 i.e., after the lapse of a predetermined time of the power supply. Owing to the reset signal RSTO#, the interruption of the AND circuits 28 and 29 ends, and hence, the input/output terminal of the optical disk controller (ODC) 17 associated with the MPU 18 is turned from the sleep state into the active state.

As may be seen from the foregoing, according to the present invention, since the sleep signal which turns OFF the second power circuit (Vcc2) on the downstream side of the power processing IC 16 is produced by the memory device itself upon request from the host computer through the interface, so that the power supply to the circuits connected to the second power circuit (Vcc2) on the downstream side of the power processing IC 16 including the MPU is cut, the power consumption can be remarkably reduced.

As can be understood from the above discussion, according to the present invention, a greater reduction in the power consumption can be expected when the power consumption reducing function of the memory device connected to the host computer is activated.

What is claimed is:

1. A memory device connected to a host computer and comprising a memory medium, a data read/write circuit including a data read/write mechanism to read and write data from and onto a recording medium, a power circuit, an electric power processing IC provided in the power circuit, an interface circuit provided at a connection to the host computer, and a micro-processor unit which controls the operation of the memory device, wherein;

said interface circuit is connected to a first portion of the power circuit on an upstream side of the electric power processing IC and has an output terminal connected to the electric power processing IC, said micro-processor unit is connected to a second portion of the power circuit on a downstream side of the electric power processing IC, said interface circuit is provided with a sleep signal generating circuit which generates a sleep signal to stop a power supply to the downstream side of the electric power processing IC when a specific instruction signal is supplied from the host computer, whereby the, power supply to the portion of the power circuit on the downstream side of the electric power processing IC including the micro-processor unit is interrupted in accordance with the specific instruction signal.

2. A memory device according to claim 1, wherein said sleep signal generating circuit stops an issuance of the sleep signal when the memory medium is inserted in the data read/write circuit to thereby re-open the power supply to the portion of the power circuit on the downstream side of the electric power processing IC.

3. A memory device according to claim 1, further comprising a pull-down resistor connected to an input/output terminal of the interface circuit to protect an internal circuit of the interface circuit when the power supply to the portion of the power circuit on the downstream side of the electric power processing IC is stopped in response to the sleep signal.

4. A memory device according to claim 1, further comprising a logic circuit connected to an input/output terminal of the interface circuit to prevent a wrong signal from being input by mistake to an internal circuit of the interface circuit when the power voltage applied to the portions of the power circuit on the upstream and downstream sides of the electric power processing IC varies.

5. A memory device according to claim 2, further comprising a pull-down resistor connected to an input/output terminal of the interface circuit to protect an internal circuit of the interface circuit when the power supply to the portion of the power circuit on the downstream side of the electric power processing IC is stopped in response to the sleep signal.

6. A memory device according to claim 2, further comprising a logic circuit connected to an input/output terminal of the interface circuit to prevent a wrong signal from being input by mistake to an internal circuit of the interface circuit when the power voltage applied to the portions of the power circuit on the upstream and downstream sides of the electric power processing IC varies.

7. A memory device according to claim 3, further comprising a logic circuit connected to an input/output terminal of the interface circuit to prevent a wrong signal from being input by mistake to an internal circuit of the interface circuit when the power voltage applied to the portions of the power circuit on the upstream and downstream sides of the electric power processing IC varies.

* * * * *

UNITED STATES PATENT AND TRADEMARK OFFICE
CERTIFICATE OF CORRECTION

PATENT NO. : 5,799,199
DATED : August 25, 1998
INVENTOR(S) : Ito et al.

It is certified that error appears in the above-identified patent and that said Letters Patent is hereby corrected as shown below:

Column 1, line 60, delete ", the" and insert

--. The-- therefor

Column 8, line 14, delete "the," and insert

--the-- therefor (first occurrence)

Signed and Sealed this

Sixth Day of April, 1999

Attest:

Q. TODD DICKINSON

Attesting Officer

Acting Commissioner of Patents and Trademarks